Sept. 20, 1949.  J. W. McBRIDE  2,482,355
COLLECTOR

Filed June 10, 1944  2 Sheets-Sheet 1

INVENTOR
John W. McBride
BY John Flann
ATTORNEY

Sept. 20, 1949.  J. W. McBRIDE  2,482,355
COLLECTOR
Filed June 10, 1944  2 Sheets-Sheet 2
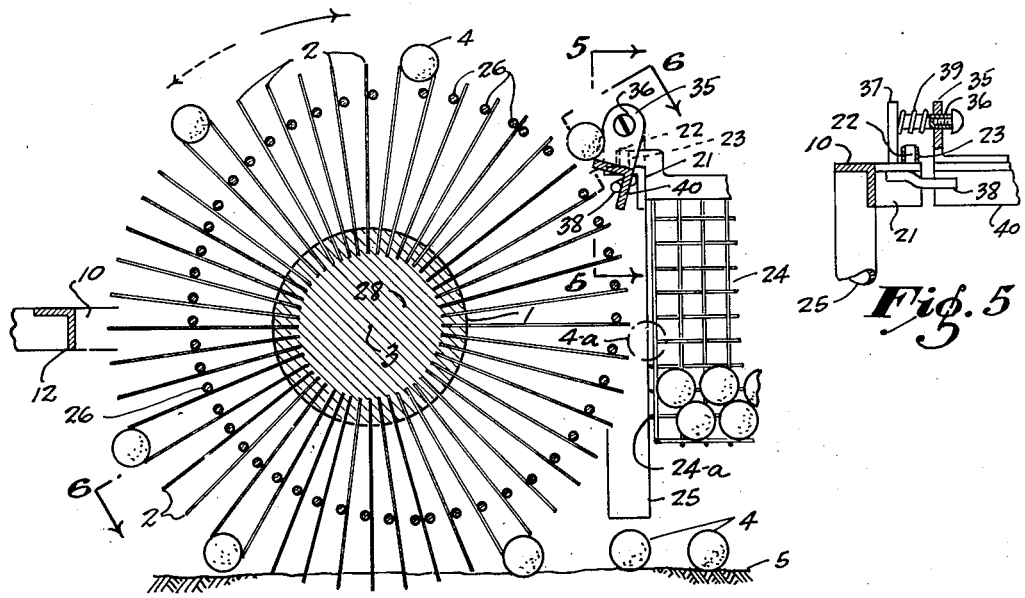
Fig. 4
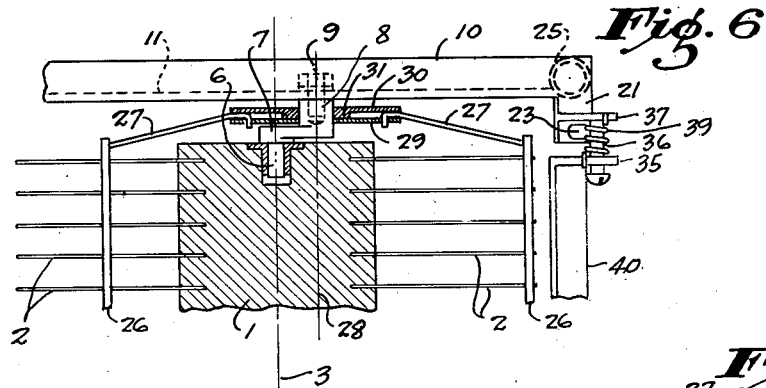
Fig. 5
Fig. 6
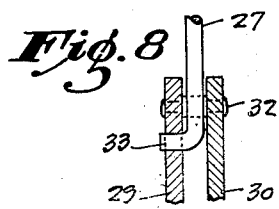
Fig. 8
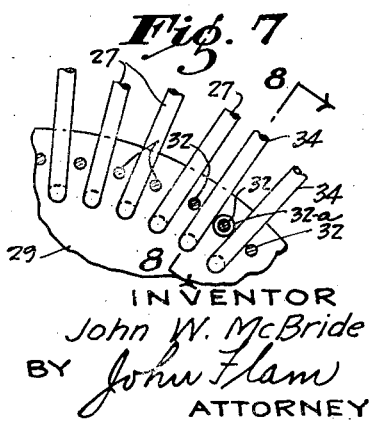
Fig. 7
INVENTOR
John W. McBride
BY John Flam
ATTORNEY Patented Sept. 20, 1949

2,482,355

UNITED STATES PATENT OFFICE 2,482,355

COLLECTOR

John W. McBride, Burbank, Calif.

Application June 10, 1944, Serial No. 539,645

4 Claims. (Cl. 56—328)

This invention relates to an apparatus for collecting objects, such as for the harvesting of nuts, or the like.

This application is a continuation, in part, of an application filed in the name of John W. McBride under Serial Number 511,280 (now abandoned) on November 22, 1943 and entitled: Collecting machine.

In that prior application, a roller or drum is described that includes a series of slender, resilient wires or rods arranged radially of the roller and fixed at their inner ends in the roller. The free, flexible ends are so spaced that the objects to be harvested, such as walnuts or almonds, are resiliently gripped by the rods. Strippers, in the form of fingers, extend between the wires and dislodge the nuts as the roller rotates, and the nuts fall into a collecting basket.

It is one of the objects of this invention to improve the device disclosed in said prior application.

The harvesting of objects by such devices is usually accomplished in groves or orchards and, therefore, objects other than the nuts often become enmeshed between the wires or rods. Some of these objects, such as leaves or earth clods, may be difficult to dislodge with the strippers, because they may be pierced by the wires as these wires pass over such objects.

It is another object of this invention to make it possible to maintain the wires or rods free of such objects, as by a continual ejecting process.

It is another object of this invention to provide an improved ejector mechanism that serves positively to eject the collected material.

It is another object of this invention to provide such apparatus capable of picking up and ejecting objects while moving in either direction.

The apparatus as described is adapted to collect objects other than nuts, for example, to gather stones in soil clearing operations, or for other purposes, even though such stones or other objects are under water. It is accordingly another object of this invention to provide a collecting apparatus adapted for use under water, or other liquid, for gathering objects off the bottom of the body of water or liquid.

It is a still further object of this invention to provide apparatus capable of retrieving objects which may become lost in sand, or the like, by being buried therein to a slight depth.

This invention possesses many other advantages, and has other objects which may be made more clearly apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Fig. 4 is an enlarged cross sectional view, taken along plane 4—4 of Fig. 2;

Fig. 5 is a fragmentary sectional view, taken along plane 5—5 of Fig. 4;

Fig. 6 is a fragmentary sectional view, taken along plane 6—6 of Fig. 4;

Fig. 7 is a fragmentary enlarged view, illustrating a feature of construction of the ejector mechanism;

Fig. 8 is a sectional view, taken along plane 8—8 of Fig. 7; and

Figure 1:
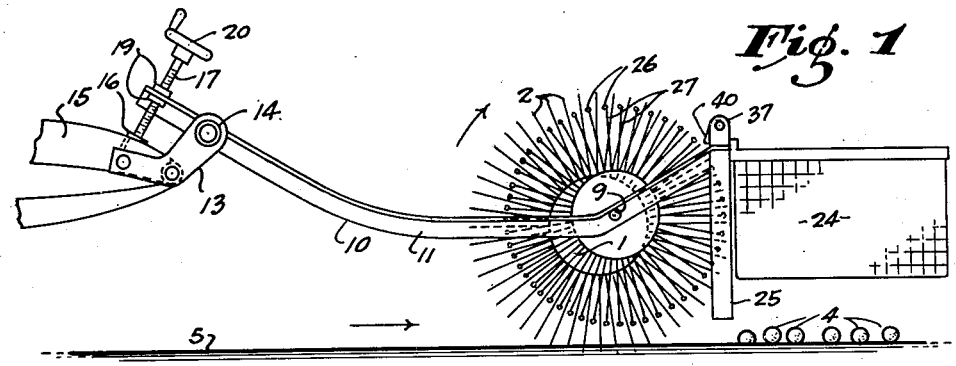
Figure 1 is a side elevation of a collector incorporating the invention, shown as attached to the front end of an automobile.

A roller or drum 1 (Figs. 4 and 6) is shown as provided with a series of radially extending wires or rods 2. The inner ends of these rods or wires are shown as accommodated in apertures in the periphery of the roller 1.

These wires or rods are arranged in regular annular patterns, uniformly spaced in an axial direction about the axis 3 of the roller. The free ends of rods 2, as explained in the prior application, are flexed to grip the objects 4, which may, for example, be walnuts, and to lift them from the ground 5 as the drum or roller is rolled over the ground.

Figure 3:
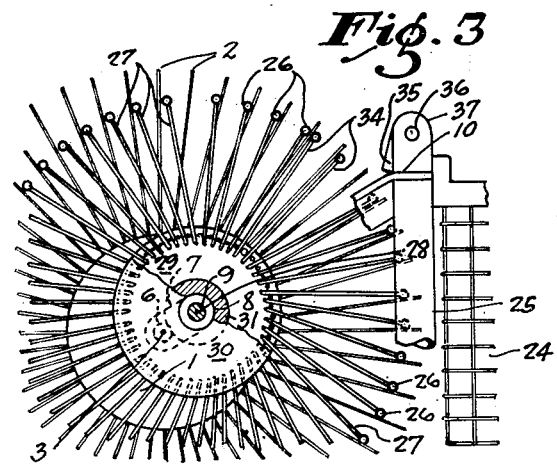
Fig. 3 is a fragmentary side elevation, partly in section, illustrating the ejector mechanism.
Figure 9:
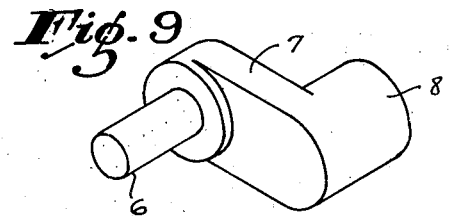
Fig. 9 is a pictorial view of the supporting member for the drum and the ejector mechanism.

The drum or roller 1 is mounted for free rotation upon a pair of stub shafts 6 (Figs. 3, 6, and 9). Each of the stub shafts 6 is shown as integral with a bearing supporting device 7 (see particularly Figs. 6 and 9). This bearing supporting device is in the form of a crank arm carrying, at one extremity, the stub shaft 6 and, at the other extremity, a cylindrical shaft portion 8. A cap screw 9 is threaded into the shaft portion 8 for the purpose of attaching the member 7 to the vertical flange 11 of a side frame 10. This side frame 10 is shown as formed of an angle iron.

Figure 2:
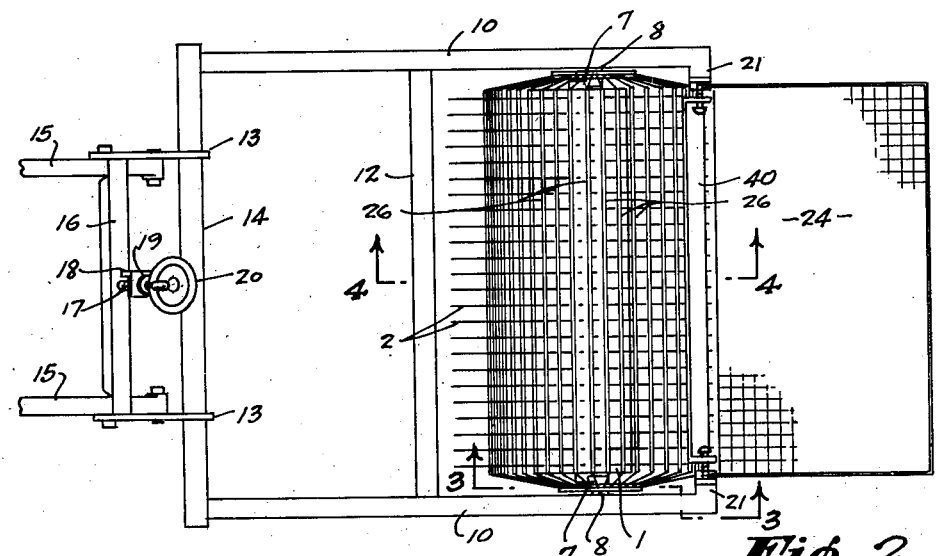
Fig. 2 is a plan view of the device illustrated in Fig. 1.

The frame, including the side 10, is also provided with a reinforcing transverse angle iron member 12. The sides 10, as shown most clearly in Figs. 1 and 2, are extended so as to facilitate connection of the device to the front portion of an automobile. This may be accomplished by providing supporting arms 13 bolted to the spring shackles of the automobile. The arms 13 provide bearing supports for the round bar 14, joining the sides 10. The spring horns 15 of the automobile may be provided with a cross piece 16 that serves as an abutment for the lower end of a screw 17 for adjusting the angular position of the frame 10—12 with respect to the axis of the bar 14. For this purpose, the bar 14 carries an angle iron 18 provided adjacent its left-hand end as shown in Fig. 1 with the threaded bosses 19. It is through this boss 19 that the screw 17 extends. By rotation of the screw 17, as by the hand wheel 20, the desired adjustment may be provided. The automobile is thus coupled to the collector to move it toward the right, as viewed in Fig. 1.

The sides 10 of the frame structure include, adjacent their front portions, the extensions 21 (Figs. 5 and 6). Upon these extensions 21 are located the upright pins 22. Ears 23, attached to a receptacle or basket 24, are detachably supported by the pins 22. Hollow posts 25 also extend downwardly from each of the front corners of the frame to provide a rest for the device when the device is uncoupled from the driving automobile.

As thus far described, the apparatus is quite similar to that described in the prior application. In this instance, however, nuts or other objects 4, enmeshed between the ends of the wires or rods 2, are ejected by a cage-like ejector structure. This ejector mechanism includes ejector bars 26 that serve to urge the nuts outwardly. The ejection is completed adjacent the top edge of the receptacle or basket 24.

The ejector mechanism for this purpose includes the bars 26 that extend in a direction generally parallel to the axis 3 of the drum or roller 1 and that are interlocked between the rods or wires 2 (Figs. 3, 4, and 6). Thus, these ejector bars 26 move radially outwardly between the rows of wires or rods 2. A pair of rods or links 27 are respectively connected at their outer ends to the opposite ends of each of the bars 26. The manner in which the inner ends of these connecting rods or links 27 are supported may be most readily understood by the aid of Figs. 6, 7, and 8.

The shaft 8, carried by arm 7, has an axis 28 eccentric with respect to the axis 3 of the drum. Mounted for free rotation on each of these shaft portions 8 are a pair of spaced flanges 29 and 30. These flanges may be appropriately joined together to form a rigid assembly, as by the aid of a hub 31 (Fig. 6). The inner ends of the links or rods 27 extend between the flanges, and are bent transversely to provide bearing portions 33 in the flange 29. In order to limit the angular movement of the connecting links or rods 27, pins 32 are interposed between them, as illustrated in Figs. 7 and 8. The slight angular motion is permitted so that the bars 26 may more readily adapt themselves to the spaces between the resilient wires 2.

The rotation of roller 1 about the axis 3 causes corresponding rotation of the cage-like structure, including bars 26 and connecting rods 27. The driving force is accomplished by contact of the wires or rods 2 with the bars 26. Several of the connecting links or rods may be appropriately fixed against angular movement with respect to the supporting flanges 29 and 30, so as to form a drive for the ejector that has no lost motion. For this purpose two sets of such links may be fixed, each indicated by reference character 34 in Fig. 4. The restraint is accomplished by the aid of the stop pins 32 (Fig. 7) closely contacting the sides of these links 34. For this purpose, that pin between links 34 has an enlarged portion 32—a.

Accordingly, as roller 1 rotates, the ejector bars 26 associated with the links 34 serve to impart rotation to the entire cage structure by positive engagement of that bar 26 with the rods or wires 2.

Rotation of the cage-like ejector mechanism about the eccentric axis 28 results in relative radial movement of the bars 26 with respect to the axis 1. In this manner, the bars 26 are reciprocated with respect to the rods 2 in a radial direction, being caused to move alternately inwardly and outwardly of the drum axis. The greatest outward movement of the bars 26 with respect to the axis 3 occurs in the plane that connects the two axes 3 and 28, as clearly indicated in Fig. 4. The plane of the cross-section of Fig. 6 is purposely chosen to pass through these two axes. Accordingly, the bar 26 at the right-hand portion of Fig. 6 represents the maximum radial excursion of the bars. The direction of this plane can be adjusted by appropriate adjustment of the supporting member 7 with respect to the sides 10. It is so adjusted that the nuts 4, or other objects to be collected, are completely ejected adjacent the top edge of the receptacle 24.

By permitting slight pivotal movement of the connecting links or rods 27, the ejector bars 26 can most readily accommodate themselves to the ejecting process.

The nuts 4 are shown as deposited upon an apron 40 that is inclined upwardly toward the right at the left-hand upright edge of the receptacle or basket 24. This apron serves to guide the objects that are collected into the basket 24. It is shown as pivotally supported by the aid of the ears 35 disposed at opposite ends of the apron 40. These ears are arranged to be pivoted upon the posts 36 extending from the upright support 37 mounted on the extensions 21. A coil spring 29 disposed over the pivoted post 36 serves to urge the apron 40 in a clockwise direction, as viewed in Fig. 4. A stop 38 is attached to the lower end of the frame extensions 21 for limiting this rotation.

In this way, should occasion require that the apron 40 adjust itself to the forces imposed upon it by the process of ejection, it will be resiliently urged about the axis of pins 36. Such forces occur, for example, if stones be forcibly ejected from the roller.

The accumulation of foreign matter in the spaces between rods 22 is prevented by the use of the ejector mechanism disclosed. Even if leaves may be picked up or pierced by the ends of the rods or wires, they are pushed off these rods by movement of bars 26 in a direction outwardly radial of the axis 5.

The apparatus is not limited to use by movement in a forward direction or toward the right, as described, but will also function when moving in the opposite direction, causing the roller 1 to rotate in the direction indicated by the dotted arrow in Fig. 4, or counter-clockwise. For this purpose, the side 24—a of basket 24 adjacent roller 1 extends a short distance only above the bottom of the basket, and somewhat below the point at which objects 4 will be ejected from the roller 1 when the roller is rotating counter-clockwise. Thus, an object, as 4—a in Fig. 5, under such conditions will pass over the top of side 24—a into basket 24.

The inventor claims:

1. In a device of the character described: a drum; a non-rotary support providing an axis of rotation for said drum, said support having an auxiliary axis parallel to the drum axis; resilient rods extending radially of the axis of said drum; ejector bars parallel to the axis of said drum; and flanges extending radially of said auxiliary axis and attached to said ejector bars, said ejector bars being continually interposed between said resilient rods and driven thereby.

2. In a device of the character described: a drum; a non-rotary support providing an axis of rotation for said drum; ejector bars parallel to the axis of the drum and freely rotatable about an auxiliary axis parallel to the axis of said drum; resilient rods extending radially of the axis of the drum, and arranged in rows longitudinally of the drum, said ejector bars being interposed between said rows.

3. In a device of the character described: a drum; a non-rotary support providing an axis of rotation for said drum, said support also providing an adjacent auxiliary parallel axis; resilient rods extending radially of the axis of said drum; and ejector bars parallel to the drum axis; radially extending flanges rotatable about the auxiliary axis and connected to the ejector bars, said ejector bars being interposed between said resilient rods and driven thereby, the circular path of the ejector bars encompassing said drum.

4. In a device of the character described: a drum; a series of rows of resilient rods fixed to the drum and extending radially therefrom; said rods having flexible free ends capable of gripping and retaining objects; a frame whereby said drum may be rolled over the ground; ejector bars extending parallel to the drum axis, said bars being interposed between the rows of rods; and means responsive to said rolling action to reciprocate the said bars in a direction radial to the drum axis.

JOHN W. McBRIDE.

REFERENCES CITED

The following references are of record in the file of this patent:

UNITED STATES PATENTS

| Number | Name | Date |
| --- | --- | --- |
| 436,935 | Corwin | Sept. 23, 1890 |
| 1,104,431 | Lint | July 21, 1914 |
| 1,650,796 | Kellogg | Nov. 29, 1927 |
| 1,808,928 | Lint | June 9, 1931 |
| 1,859,980 | Mueller | May 24, 1932 |
| 1,879,905 | Liebfried | Sept. 27, 1932 |
| 2,282,868 | Innes | May 12, 1942 |